Oct. 10, 1961 C. R. CHARD 3,003,485
RADIAL TYPE TWO-STROKE CYCLE INTERNAL COMBUSTION
ENGINE WITH CRANKCASE COMPRESSION MEANS
Filed Dec. 19, 1960
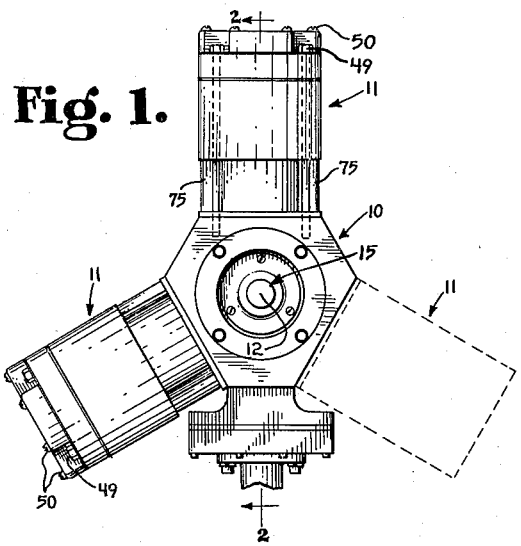
Fig. 1.
Fig. 4.
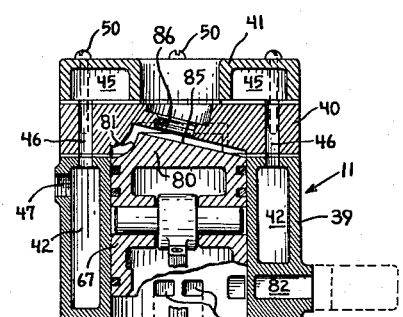
Fig. 2.
Fig. 3.
INVENTOR.
CLIFFORD R. CHARD
BY
Lakwood, Woodard, Smith & Wikart
Attorneys «United States Patent Office»

3,003,485
Patented Oct. 10, 1961

3,003,485
RADIAL TYPE TWO-STROKE CYCLE INTERNAL COMBUSTION ENGINE WITH CRANKCASE COMPRESSION MEANS
Clifford R. Chard, 1307 Lincoln Ave., New Castle, Ind.
Filed Dec. 19, 1960, Ser. No. 76,789
1 Claim. (Cl. 123—55)

The present invention relates to an internal combustion engine and more particularly to an internal combustion engine of the radial two-cycle type.

One advantage of the radial type of engine is the relatively short axial space it occupies which not only saves space but also facilitates balancing and reduces vibration. One problem present in the construction and operation of two-cycle engines is insuring the rapid removal of the burnt gases from the combustion chamber and their rapid replacement by a new combustible charge. A primary object of the present invention is to provide an engine which incorporates the above advantage, yet presents an efficient solution to the above problem.

A further object of the present invention is to provide an improved internal combustion engine.

Still another object of this invention is to provide a multiple cylinder engine incorporating improved means for replacing a burned charge in the combustion chamber with a fresh combustible charge.

Related objects and advantages will become apparent as the description proceeds.

One specific embodiment of the internal combustion engine of the present invention comprises a crankcase having a crankshaft rotatably mounted therein, said crankshaft being provided with a plurality of cranks radially arranged and axially spaced along the crankshaft. A plurality of cylinders are spirally located with respect to the axis of the crankshaft and extend radially thereof. The engine further includes a piston in each of the cylinders and connecting rods joining respective pistons and cranks. Partitions, which also act as bearings for the crankshaft, separate the crankcase into a plurality of chambers each of which opens into the proximal end of a respective one of the cylinders whereby movement of respective pistons toward the crankshaft axis produces compression within the respective chamber. Two intake conduits opposite each other lead from each chamber into the sidewall of the associated cylinder for conducting the combustible charge from the chamber to its respective cylinder.

The full nature of the invention will be understood from the accompanying drawings and the following description and claim.

FIG. 1 is a top plan view of an internal combustion engine constructed according to the present invention.

FIG. 2 is a vertical section taken along the line 2—2 of FIG. 1 in the direction of the arrows.

FIG. 3 is a side elevation of the structure illustrated in FIG. 1.

FIG. 4 is a perspective view of a crankcase forming a part of the engine of FIGS. 1–3.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated an internal combustion engine of the radial two-cycle type including a crankcase 10 and a plurality of cylinders 11 mounted thereon in a spiral fashion. In other words, the cylinders 11 not only extend radially with respect to the axis 12 of the crankshaft 15 but they also are spaced axially along the crankcase. The cylinders each have a maximum outer diameter which is approximately equal to half of the length of the crankcase which dimension is, of course, made possible by the fact that the cylinders are radially located.

The crankcase is illustrated in detail in FIG. 4 and has an outward hexagonal shape with three wider sides 16 each adapted to mount a respective one of the cylinders 11 and three narrower sides 17, one of which is provided with three passages 20 which extend through the sidewall of the crankcase. Internally, the crankcase has a plurality of inwardly extending annular raised portions 21–24 which provide mounting supports for the annular elements 25 and partitions 26.

The annular elements 25, which are secured in place to the crankcase by screws 25A, function to mount ball bearings 28 and to provide closure elements for the opposite ends of the crankcase. Suitable seals 27 are received upon the crankshaft 15 at each end thereof and function to retain lubrication within the ball bearings 28 and to seal off the opposite ends of the internal cavity within the crankcase. The partitions 26 are secured to the crankcase by means of screws 30 and may be formed in two sections in order to facilitate assembly about the portions 31 of the crankshaft prior to the insertion of the crankshaft into the crankcase.

The crankshaft 15 includes three cranks 32 which are balanced by elements 35 also forming a part of the crankshaft. The cranks 32 are spaced radially about the axis of the new crankshaft and at angles of 120 degrees with respect to one another and are also axially spaced with relation to the crankshaft. Similarly to conventional engines, one end 36 of the crankshaft may be used as the power take-off and the other end 37 may be used to connect the conventional magneto and flywheel to the crankshaft.

In the present embodiment, each of the cylinders 11 is formed in three parts, the cylinder, itself, 39, the cylinder head 40 and a cylinder head water jacket 41. The cylinder is provided with suitable water cooling arrangement including cavities 42 and 45 in the elements 39 and 41, respectively, said cavities being arranged to surround the combustion chamber. The cavities are connected by means of bores 46 and water or other coolant is circulated through the cavities and passages from the entry 47 to a suitable exit.

In the present embodiment, the water jacket 41 is secured to the cylinder head by screws 50 and the cylinder head is secured to the section 39 by screws 49; however, it can be appreciated that each complete cylinder could be constructed in one piece if so desired and proper facilities were available. A carburetor 51 (only partially shown) has an exit passage 52 which opens into a chamber 55 within a housing 56, the carburetor being fixed to the housing 56 by means of suitable screws 57. The housing is made up of three sections (plus suitable gaskets where needed) which include the entry section 60, the valve section 61 and the exit section 62.

The valve section 61 is provided with a plurality of check valves 65 which control the passage of the combustible charge from the chamber 55 into three passages 66 leading into the passages 20 in the crankcase. These check valves 65, which may consist of flat, elongated, resilient cantilever elements, function to allow flow from the chamber 55 into the passages 66 but to prevent flow in a reverse direction. In other words, at such time as the pressure within the chamber 55 becomes greater than the pressure in a respective one of the passages 66, the particular check valves 65 associated with that passage 66 will permit the passage of combustible fluid thereto.

The combustible fluid from the carburetor is pumped into the combustion chamber by the action of the pistons 67, each of which is received within a respective one of the cylinders 11 in conventional manner and are joined to a respective one of the cranks 32 by means of connecting rods 70, also in conventional manner. Each connecting rod 70 extends through a relatively large aperture 71 in the sidewall of the crankcase. As the piston 67 moves toward the distal end of its cylinder, it acts to reduce the pressure within the proximal end of the cylinder, the aperture 71 and the respective chamber 72 associated with the cylinder and defined by one of the annular elements 25 and one partition 26 (or, in the case of the centermost piston, the two partitions 26). The reduction of pressure within the particular chamber 72 causes the check valve 65 associated with the chamber 72 to open and to allow the combustible charge to enter the respective chamber 72. In other words, a suction is created within the chamber 72 and the passages 66 and 20 associated therewith causing the respective check valve to open and to allow the combustible charge to enter the respective chamber 72.

Each of the cylinders 11 has formed integrally with the cylinder portion 39 a pair of conduits 75 each of which open diametrically oppositely of one another at 76 through the sidewall of the cylinder, said openings being so located that they are closed off by the piston during the outward portion of its travel but opens into the combustion chamber when the piston is at the inward end of its travel. The conduits 75 each register with a passage 77 in the wall of the crankcase. It can be appreciated that the pressure created by the stroke of the piston toward the crankcase will be transmitted through the cavity in the proximal portion of the cylinder and the passage 71 into the chamber 72 and will cause the combustible fluid within the chamber 72 to be forced through the passages 77 and conduit 75 into the combustion chamber. This effect, however, will only occur when the piston has moved sufficiently close to the crankcase to allow the conduit 75 to open into the combustion chamber.

The head or the distal end 80 of the piston is formed with a semi-circular recess 81 which extends around the head of the piston and has its ends located to register with the openings 76 and so as to receive combustible gas from the two conduits 75 of the cylinder. The particular shape of the head of the piston causes the gas to be guided upwardly in the piston and to provide a scavenging action, the gas moving first upwardly and then downwardly and removing burnt gases within the combustion chamber and forcing them through the exhaust port 82 in the wall of the cylinder. It should be noted that the head of the piston also has a sloping configuration at 85 which leads into and guides the burnt gases into the exhaust port when the piston is in its innermost or close-to-the crankcase position.

It can be appreciated that the construction and operation of the various other cylinders is similar to the one above described, it being noted that the various cylinders are arranged at 120 degrees with relation to each other and will operate in order at equal time intervals as far as the combustion stroke, for example, is concerned. Stated in another way, the engine should be so constructed and arranged that an alternate firing arrangement is provided, i.e. the cylinders fire alternately. A suitable spark plug is received in the threaded aperture 86 formed in cylinder section 40 and is operated by the above mentioned magneto in conventional manner.

From the above description, it can be appreciated that the present invention provides an improved radial two-cycle engine which may be constructed so as to occupy a relatively small axial space and yet provides means for rapid replacement of burnt gases by combustible gases.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

An internal combustion engine comprising a crankcase, a crankshaft rotatably mounted in said crankcase and including a plurality of cranks radially arranged and axially spaced along said crankshaft, a plurality of cylinders mounted on the crankcase spirally about the axis of said crankshaft, pistons in said cylinders, connecting rods joining respective pistons and cranks, said pistons and crankshaft being so arranged that the individual cylinders fire alternately and at equal time intervals, partitions separating said crankcase into a plurality of chambers each of which opens into the proximal end of a respective one of said cylinders, said partitions also acting as bearings for said crankshaft, said crankcase being formed with inwardly extending annular flanges forming supports for and fixedly mounting said partitions, a pair of intake conduits leading from each of said chambers and opening into its respective cylinder through the sidewall thereof, said crankcase having a plurality of passages each of which leads into a respective one of said chambers, means for supplying a gaseous explosive mixture to said passages, and a plurality of check valves each of which controls a respective one of said passages and permits flow through its passage into said crankcase but prevents flow therefrom.

References Cited in the file of this patent
UNITED STATES PATENTS

| | | |
|---|---|---|
| 974,544 | Akerman | Nov. 1, 1910 |
| 1,217,020 | Laurents | Feb. 20, 1917 |
| 1,441,111 | Paterson | Jan. 2, 1923 |
| 1,713,759 | Irwin | May 21, 1929 |
| 2,076,892 | Irgens | Apr. 13, 1937 |
| 2,616,403 | Kiekhaefer | Nov. 4, 1952 |